United States Patent [19]

Fiehmann et al.

[11] 3,859,510

[45] Jan. 7, 1975

[54] DATA SEPARATION CIRCUITRY FOR READING INFORMATION FROM A MOVING SUPPORT

[75] Inventors: Donald E. Fiehmann, San Jose; Kim C. Reynolds, San Martin, both of Calif.

[73] Assignee: International Business Machines, Armonk, N.Y.

[22] Filed: Dec. 26, 1973

[21] Appl. No.: 428,582

[52] U.S. Cl. ..... 235/61.11 D, 235/61.11 E, 328/63, 329/107, 360/43

[51] Int. Cl. ........ G06k 7/08, G06k 7/10, G11b 5/09

[58] Field of Search .............. 235/61.11 D, 61.11 E; 360/43, 51, 2; 328/63; 329/104, 107; 250/555, 566

[56] References Cited

UNITED STATES PATENTS

| | | | |
|---|---|---|---|
| 3,356,934 | 12/1967 | Halfhill et al. | 328/63 |
| 3,483,539 | 3/1966 | Poumakis | 360/43 |
| 3,518,554 | 6/1970 | Gabor | 328/63 |
| 3,597,752 | 9/1969 | Eldert | 340/174.1 H |
| 3,711,843 | 4/1971 | Galvagni | 360/43 |
| 3,750,108 | 2/1971 | Jensen | 340/172.5 |
| 3,806,706 | 4/1974 | Hasslinger et al. | 235/61.11 E |
| 3,811,033 | 5/1974 | Herrin et al. | 235/61.11 E |

*Primary Examiner*—Daryl W. Cook
*Attorney, Agent, or Firm*—Shelley M. Beckstrand

[57] ABSTRACT

An internally clocked digital circuit for decoding double frequency data. A first counter develops a count representative of the elapsed time between two adjacent timing pulses in the signal train. Upon detecting the second of the two adjacent timing pulses, that count is loaded into a second counter. The second counter is stepped at a higher frequency than the first counter to provide an output signal after counting said count. The output signal of the second counter is used to load data signals into a deserializer, and to identify the next timing pulse in the signal train.

Also, means for generating sequential control signals for controlling the resetting of the counters and loading the count from the first counter into the second counter with each timing pulse in the signal train, and for ignoring initial signals in the signal train.

6 Claims, 3 Drawing Figures

Patented Jan. 7, 1975

3,859,510

3 Sheets-Sheet 1

Patented Jan. 7, 1975

3,859,510

3 Sheets-Sheet 2

DATA SEPARATION CIRCUITRY FOR READING INFORMATION FROM A MOVING SUPPORT

BACKGROUND OF THE INVENTION

1. Field of the Invention

This invention relates to the readout of information from an element requiring relative movement between the element and a transducer. The element may be magnetically encoded, for example, with information and timing signals interspersed in a double frequency code. The relative movement may result from moving either the element or the transducer.

2. Description of the Prior Art

The double frequency code, sometimes referred to as F/2F, is well known in the art. This code is the same as a pulse rate modulation code with a 2:1 pulse rate ratio. In these codes, clock and data signals are interleaved such that each data signal appears between two adjacent clock signals and where each data signal is separated by one or more clock signals. Many circuits have been provided for separating the data signals from the clock signals, with most of them requiring extremely close tolerances on the frequency of the signal train in order to synchronize that signal train with an oscillator or interval clock which controls the decoding or separation circuit.

A few circuits and methods have been provided for separating the data signals from a signal train where the signal frequency is subject to wide variations - as when decoding double frequency data encoded in a magnetic stripe on a card or tape where the card or the read head is driven by hand.

In one such circuit, a pair of capacitors are alternately charged and discharged at different rates to time the clock to clock rate and detect and presence of a data signal before the next clock in the signal train to be decoded. Such analog detection circuits are expensive and relatively unreliable.

Exemplary of digital double frequency decoding circuits known in the art is the circuit described in an application by W. A. Boothroyd, Ser. No. 287,132 filed Sept. 7, 1972, now abandoned, for Demodulating Circuitry for Pulse Rate Modulation Data Reproduction - which application also references a number of other prior art circuits. The Boothroyd circuit requires the use of a comparator circuit for comparing the time intervals between succeeding pairs of transitions and a shift register circuit for enabling that comparison against lower and higher limits on the ratio.

Another prior art decoding circuit requires a comparator logic circuit for comparing the output of a period detector and a prior period period memory, and also discloses an equivalent analog circuit based upon single shot discharge periods controlled by a series of integrators.

In yet another prior art circuit, a self-adapting synchronizing circuit is provided for decoding variable frequency, F/2F encoded data. In this circuit, three counters are utilized. During each clock to clock period, two counters are driven forward by a common oscillator with the second counter also driven backwards one count for every predetermined number of forward pulses applied to the first counter. Upon occurrence of the second clock signal, the content of the second counter is loaded into a third counter which is then driven backwards by said oscillator. The second counter must be capable of counting up and down, and is thus significantly more complicated than a simple unidirectional counter.

In all of these prior art devices for decoding variable velocity data signals, the decoding circuitry requires complicated analog components, comparators, or up/-down (bidirectional) counters. There exists, therefore, a need for a low cost, highly reliable decoding circuit which significantly reduces the number and complexity of the components, and which can be packaged in a low cost, hand driven card reader - as in terminal devices for retail, banking, inventory and other similar systems.

SUMMARY OF THE INVENTION

By way of summary, the invention comprises an apparatus and method for decoding double frequency encoded data where timing pulses interspersed with data pulses are recorded on a medium. During readback, data signals read from the medium are separated from the clock signals and assembled into characters for subsequent utilization. First counter means, driven by a high frequency oscillator, develops a count representative of the elapsed time (roughly representative of the distance) between two adjacent clock signals. A second counter is loaded with the contents of the first counter (or the complement, depending upon the type of counter used) upon detecting the occurrence of the second of said adjacent clock signals. The second counter then is driven at a higher frequency than said first counter to provide an output signal after counting to the value counted by said first counter, such that said output signal occurs after the second clock signal at some fraction of the time elapsed between said previous two adjacent clock pulses. Latch means, controlled by said output signal, identifies the clock pulse in the raw clock and data signal stream, controls the loading of data pulses into a deserializing shift register, and controls the resetting and loading of the counters.

BRIEF DESCRIPTION OF THE DRAWINGS

The foregoing and other objects, features and advantages of the invention will be apparent from the following more particular description of preferred embodiments of the invention, as illustrated in the accompanying drawings, in which.

DESCRIPTION

Figure 1:
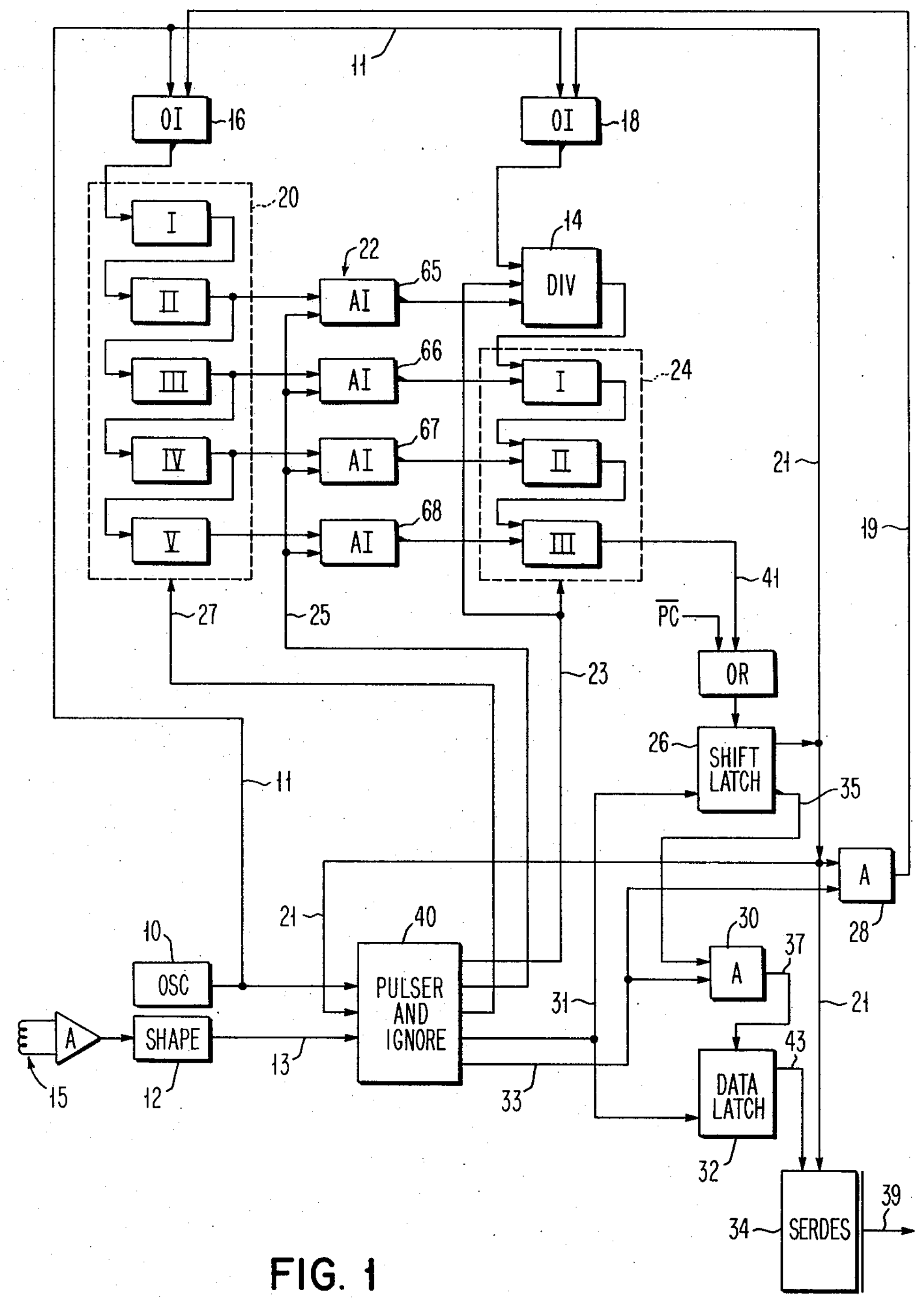
FIG. 1 is a block diagram of applicants' data separation circuit.

Referring now to the drawings, a detailed description will be given of preferred embodiments of the invention.

Referring to FIG. 1, the major components include the Pulser and Ignore circuit 40, which will be described more fully in connection with FIG. 2. This circuit operates to generate a series of timing pulses 44, 45, 46, and 47 as shown in FIG. 3. These pulses control the resetting and shifting of the various counters and latches, and are generated in connection with the detection of each clock or timing pulse appearing on the input line 13 - following the first few signals, which are ignored.

UP Counter 20 and Shift Counter 24, in connection with the load gates 22, operate under control of the oscillator 10 and Divide circuit 14 to generate a count representing the clock to clock timing in the signal train on line 13 and for operating the data separation latches 26 and 43. Serializer-deserializer 34 assembles the information pulses into characters for transference to the utilization device (not shown) along lines 39.

A more detailed description will now be given of FIG. 1. Transducer 15 provides a read signal from, for example, a magnetically or optically encoded card or tape, which is amplified to provide the transducer output signal shown in FIG. 3, and fed to the Shaping circuit 12 to provide the signal (shown in FIG. 3) along line 13 to Pulser and Ignore circuit 40. An internal clock or oscillating circuit 10 has its output fed along lines 11 to Pulser and Ignore circuit 40 and to the OR Invert circuit 16 and 18.

The Reset Shift Counter output of Pulser and Ignore circuit 40 is fed along line 23 to Shift Counter 24 and Divide circuit 14. The Load Shift Counter output of pulser and Ignore circuit 40 is fed along line 25 to load gates 22. The Reset UP Counter output of Ignore circuit 40 is fed along line 27 to UP counter 20. The Reset Shift and Data Latches output of the Pulser circuit 40 is fed along lines 31 to the reset inputs of Shift Latch 26 and Data Latch 32. Any Pulser signal out from Pulser and Ignore circuit 40 is fed along line 33 to AND gates 28 and 30.

A high frequency oscillator, or internal clock 10, provides clocking pulses along lines 11 to OR Invert circuits 16 and 18 and Pulser and Ignore circuit 40.

UP Counter 20 comprises five stages, as shown herein by way of example and not limitation, with each stage comprising a flip-flop. The first two stages form a divide by four circuit, and the high order stages develop the clock to clock count. OR invert circuit 16 feeds the first stage, and reset UP counter line 27 is provided for resetting all of the stages to zero. Load gates 22 comprise AND invert circuits 65–68, each providing a positive output when both of its inputs are negative. Load shift counter line 25 forms one input to each of the AND Invert circuits 65–68, while the outputs of stages II–V provide the other input.

Shift Counter 24 comprises three stages, each stage being a flip-flop. Of course, more stages may be provided. OR Invert circuit 18 provides one input to Divide circuit 14, with the other input being the output of AND Invert circuit 65 and Reset Shift Counter 23. The first stage of Shift Counter 24 is fed by the output of the Divide circuit 14 and AND Invert circuit 66. Stage II of Shift Register 24 has as its inputs the outputs of stage I and of AND Inverter 67, its output being fed to stage III. The other input to stage III of Shift Counter 24 is the output of AND inverter 68, and the output of this stage is fed along line 41 to set the Shift Latch 26. Shift Latch 26 is set by an output from the Shift Counter along line 41 and $\overline{PC}$, is a reset by the Reset Shift and Data Latch line 31. The set output of Shift Latch 26 is fed to OR Invert 18 along line 21, to AND gate 28, to Pulser and Ignore circuit 40, and into SERDES 34. The reset output of Shift Latch 26 is fed along line 35 to one leg of AND gate 30. The input to AND gate 30 is Any Pulser line 33, and its output appears along line 37 to set the Data Latch 32. Data Latch 32 is reset by a signal on Reset Shift and Data Latch line 31, and its set output 43 feeds into SERDES 34. The inputs to AND gate 28 are the set outputs of Shift Latch 26 on line 21 and the Any Pulser signal on line 33. The output of AND gate 28 is provided along line 19 to OR invert circuit 16.

Herein, Divide circuit 14 is a divide by three circuit providing one pulse into the first stage of shift counter 24 for each three clock pulses or signal transitions appearing on line 11 and gated through OI 18. Such a circuit is described at page 272 of The Texas Instruments Components Group's publication "Designing with TTL Integrated Circuits," copyright 1971. Similarly, each of the various counters, latches, AND, and OR gates, SERDES registers, shapers, and transducers shown are readily available components well known to those skilled in the art.

An overflow from Shift Counter 24 appearing on line 41 sets Shift Latch 26, which is reset by an output on Reset Shift and Data Latches line 31. The set output of Shift Latch 26 is fed to AND gate 28, to OR Invert gate 18, and back into Pulser and Ignore circuit 40, as well as to shift the contents of SERDES 34. When Shift Latch 26 is not set, the output on line 35 forms one input to AND gate 30, the other input being the appearance of Any Pulse on line 33. The output of AND 30 sets Data Latch 32, which is reset by a pulse on line 31. The content of Data Latch 32 is transferred into serdes 34 upon the appearance of an output from Shift Latch 26 on line 21.

In operation, the appearance of a clock pulse on line 13 provides, in a time sequential fashion, outputs on lines 23, 25, 27, and 31. First, a signal on line 23 resets the shift counter 24 to all zeroes. Then, the signal on line 25 causes transfer of the ones complement of the contents of the UP counter 20 to the Shift Counter 24 through the Load Gates 22. UP Counter 20 is then reset to zero by a signal on line 27. Finally, Shift Latch 26 and Data Latch 32 are reset by a signal on line 31.

When Shift Latch 26 is set, line 21 is positive, thus holding OR Invert 18 off to block passage of oscillator 10 pulses to Divide circuit 14. Conversely, when Shift Latch 24 is reset, line 21 is down - thus allowing oscillator 10 output signals to pass through OR Invert 18 to Divide circuit 14.

When Shift Latch 26 is set and Any Pulser line 33 is on, a signal on line 19 blocks OR Invert 16, thus preventing toggling of UP Counter 20 by oscillator 10. Conversely, when AND 28 is not made, then OR Invert 16 is allowed, passing oscillator 10 pulses through to toggle UP Counter 20.

UP Counter 20 counts up to derive a count representing the time elapsed between two adjacent clock pulses on line 13. During this time, Shift Counter 24 is driven by oscillator 10 through Divide circuit 14 at a faster rate than stages III, IV, and V of UP Counter 20 so as to provide on line 41 a signal setting Shift Latch 26 after a time equal to 75 percent, approximately, of the elapsed time between the previous adjacent clock pulses on line 13. If, prior to a signal on line 41, a pulse appears on line 33, AND gate 30 provides a set pulse on line 37 setting the Data Latch 32. However, if prior to setting Shift Latch 26, no data pulse appears on line 33, Data Latch 32 remains in the reset mode. In either event, upon receiving an output from Shift Counter 24 setting Shift Latch 26, the shift pulse on line 21 causes the SERDES shift register 34 to shift and load into its low order position the contents of Data Latch 32.

AND circuit 28 detects the beginning of the next clock pulse and inhibits the counting of UP Counter 20 for the duration of the Any Pulser signal on line 33. This causes complementing and loading of the contents of stages III through V of UP Counter 20 to the Shift Counter 24, of stage II of UP Counter 20 to the Divide by Three circuit 14, and the resetting of circuits 20, 22, and 24 to zero.

A more detailed description of the operation of UP Counter 20, Load Latches 22, Divide by Three circuit 14, and Shift Counter 24 follows. With the appearance of a pulse on line 23, Divide by Three circuit 14 and each stage of the Shift Counter 24 are set to zero. With the appearance of a pulse on line 25, the contents of stages III, IV, and V of up counter 20 are inverted and loaded into stages I, II, and III, respectively, of Shift Counter 24. By dropping the contents of stages I and II of UP counter 20 the count developed in UP Counter 20 is effectively divided by four before being inverted and transferred to the Shift Counter 24. Neglecting for the moment the operation of AND invert 65 which transfers the complement of the second stage of UP counter 20 into the Divide by Three circuit 14, it will be seen that for a large number of stages in each of the Counters 20 and 24, stages I, II, and III of shift counter 24 are counted up at a rate faster than stages III, IV, and V of UP counter 20. Thus, an overflow on line 41 will appear at a time following a clock pulse on line 13 which is equal to approximately 75 percent of the time elapsed between that clock pulse and the next previous clock pulse on line 13. Now, for a finite number of stages in the UP counter 20 and shift counter 24, the operation of AND invert 65 loading the complements of the second stage of UP counter 20 into the Divide by Three circuit 14 operates to more closely approximate that 75 percent ratio. However, for a sufficiently large number of stages, that ratio is sufficiently closely approximated without the inclusion of AND invert circuit 65, and the setting of the Divide by Three circuit to the inverted contents of the second stage of UP Counter 20. Of course, another minor deviation from a perfect 75 percent relationship is introduced by inhibiting the passage of oscillator pulses on line 11 through the OR Invert circuits 16 and 18 while Counters 20 and 24 are being cleared and set. However, in practice, this deviation from an absolute ratio is not troublesome.

Figure 2:
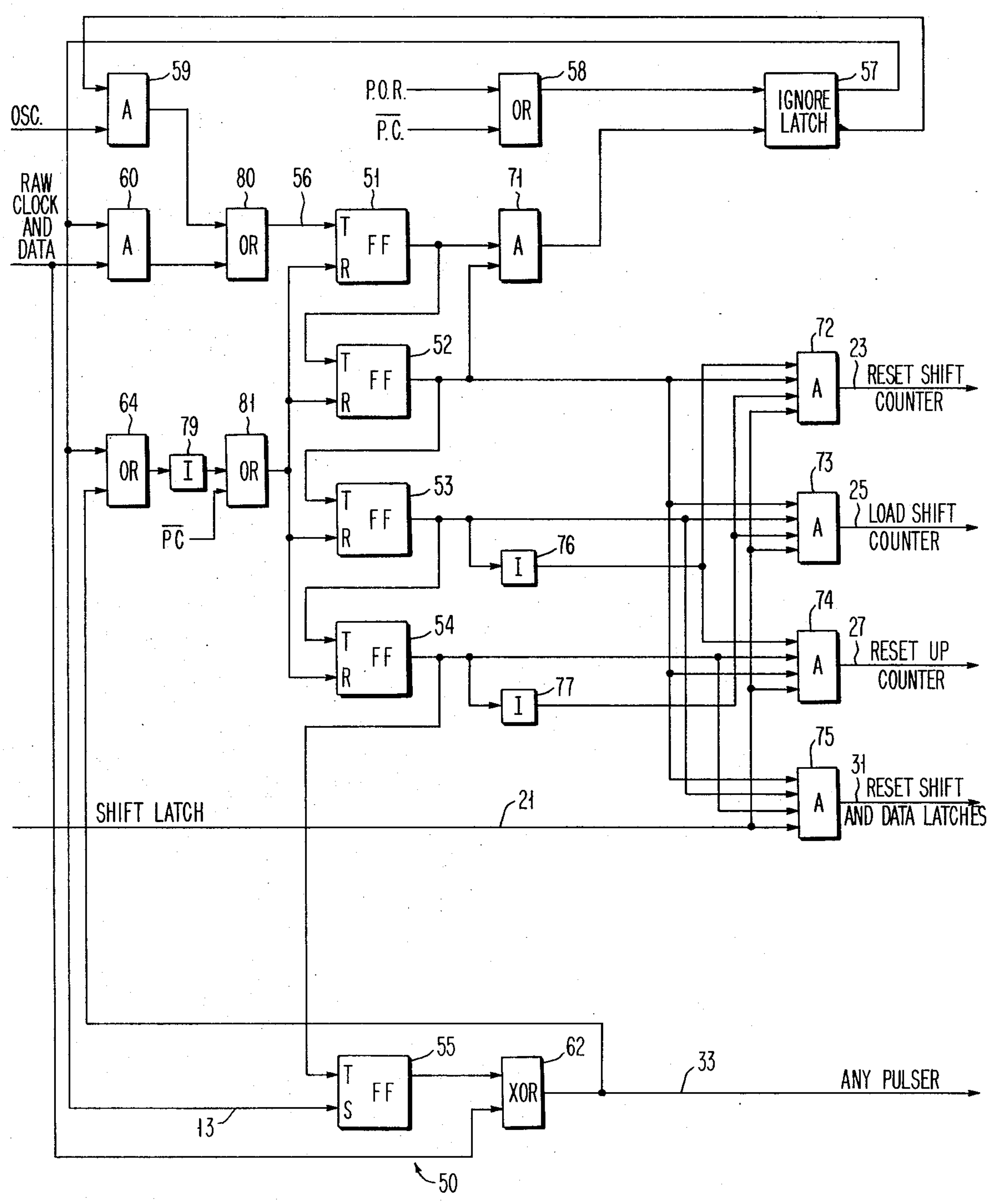
FIG. 2 is a block diagram of the Pulser and Ignore circuit of FIG. 1.
Figure 3:
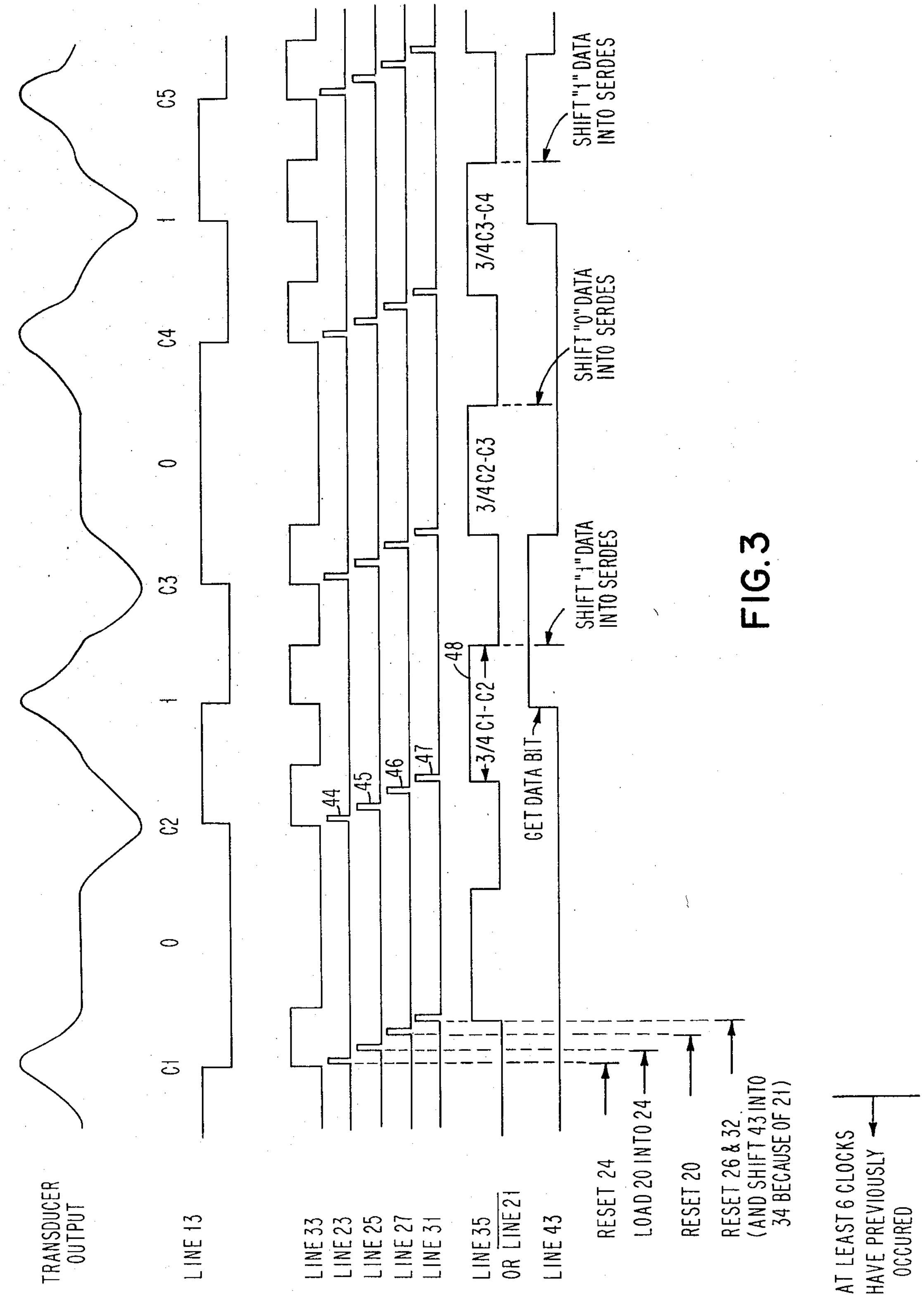
FIG. 3 is a timing chart showing the states of selected components during an exemplary operation of the circuits of FIG. 1 and FIG. 2.

Turning now to FIG. 2, a detailed description will be given of the Pulser and Ignore circuit 40. The output of oscillator 10 appearing on line 11 is fed into AND gate 59. Raw Clock and Data from Transducer 15 and Shaper 12, on line 13 is fed into AND gate 60 and into Exclusive OR circuit 62. The set output of Shift Latch 26 appearing on line 21 is fed into AND gates 23, 25, 27, and 31. The inputs to OR circuit 58 are Power On Reset and Not Photo Cell ($\overline{PC}$) indicating that a magnetic or optical card is not present for sensing by transducer 15. The output of OR circuit 58 resets Ignore Latch 57, the set output of which is fed into AND gate 59 and the reset output of which is fed into AND gate 60, OR circuit 64, and the set input of Flip-Flop 55. The outputs of AND gates 59 and 60 are fed to OR circuit 80, the output of which toggles Flip-Flop 51. The output of Flip-Flop 51 is fed to AND gate 71 and to Toggle Flip-Flop 52. The output of Flip-Flop 52 is fed to AND gates 71, 72, 73, 74, 75, and to the toggle input of Flip-Flop 53. The output of Flip-Flop 53 is fed to the toggle input of Flip-Flop 54, to AND circuits 73 and 75, and through Inverter 76 to AND circuits 72 and 74. The output of Flip-Flop 54 is fed to the toggle input of Flip-Flop 55, to AND circuits 74 and 75, and through Inverter 77 to AND circuits 73 and 72. The output of Flip-Flop 55 is fed to Exclusive OR 62, the output of which is also fed back to OR circuit 64. The output of OR circuit 64 is inverted at Inverter 79 and fed to OR circuit 81, the other input to which is $\overline{PC}$. The output of OR gate 81 is fed to the reset inputs of Flip-Flops 51, 52, 53, and 54.

The operation of the circuit of FIG. 2 will next be described. With Power On Reset or no document covering the lens ($\overline{PC}$) enabling OR circuit 58, ignore latch 57 is held reset. With Ignore Latch 57 reset, AND gate 59 is disabled, blocking passage of oscillator 10 pulses and AND gate 60 is enabled, permitting the passage of raw clock and data pulses. Also, with Ignore Latch 57 reset, a positive pulse appears on one input to OR circuit 64. With Any Pulser signal of line 39 also feeding OR circuit 64, the output of which is inverted, a signal will appear out of OR 81 to reset Flip-Flops 51 through 54 only when the Ignore Latch is set and there is no Any Pulser signal on line 33, or when $\overline{PC}$ is positive.

Thus, at Power On Reset, Counter 50, comprising Flip-Flops 51–55, is not held either set or reset, and thus enabled to run. However, as long as a card is not under transducer 15, such that the lens of the photo cell is not covered and $\overline{PC}$ is positive, Counter stages 51–54 are held reset, and the Counter stage 55 is held set. After a card is sensed beneath the read head and $\overline{PC}$ goes negative, line 13 has to experience five or six changes in state (to permit passage of initial, poor quality transitions) before Ignore Latch 57 will be set by an output from AND gate 71. This is accomplished by toggling Flip-Flops 51 and 52 under control of pulses on Raw Clock and Data line 33 through AND gate 60. This occurs inasmuch as Ignore Latch 57 is in the reset condition, thus enabling AND gate 60 and disabling AND gate 59. Assume, for example, that line 13 is down and Flip-Flop 51 toggles (that is, changes states) on positive going transitions. When line 13 goes up, it is gated through AND circuit 60 to toggle Flip-Flop 51 on. The second (or negative going) transition on line 13 has no effect. The third transition on line 13 (positive going) toggles Flip-Flop 51 off and Flip-Flop 52 on. The fourth transition on line 13 is ignored. The fifth transition on line 13 toggles Flip-Flop 51 on, while Flip-Flop 52 remains on. This condition is decoded in AND gate 71 to set Ignore Latch 57. With Latch 57 set, AND gate 60 is degated and AND 59 is gated. As the reset output of Latch 57 goes minus, and as Flip-Flop 51 toggles on positive transitions, then Raw Clock and Data line 13 is in a positive state. Thus, Exclusive OR 62 is off, and line 33 is down, such that both inputs to OR 64 are off, OR 81 is turned on to reset the Flip-Flops 51–54.

The next negative transition on line 13 will turn off OR 81 to quit resetting Flip-Flops 51–54, allowing them to toggle with oscillator 10 pulses as AND 59 is gated and AND 60 is degated by Ignore Latch 57.

Oscillator 10 now toggles Counter 50 until Flip-Flop 55 is toggled off, as it is not being held set by Ignore Latch 57. Flip-Flop 55 will toggle off while line 13 is still down, as Oscillator 10 generates clock pulses much faster than the raw clock and data frequency. With Flip-Flop 55 turned off, and line 13 down, Exclusive OR 62 is turned off causing Flip-Flops 51–54 to be reset.

Thus, counter 50 operates with each signal on line 13. However, as decode logic 72–77 is degated on data transition by Shift Latch output 21 being off, control signals on 23–31 are generated only for clock pulses on line 13.

Any Pulser signal on line 33, however, appears with each transition on line 13 (as seen in FIG. 3). That is, Flip-Flop 55 now toggles sixteen oscillator counts after the last raw clock and data transition. Thus turns off Any Pulser line 33, which is turned on by each transition on line 13.

Thus, Counter 50 cycles for every change in state on line 13 at a rate determined by the frequency of oscillator 11 after the first initial five or six pulses on line 13 have been ignored. AND gates 72–75 in conjunction with inverters 76 and 77 decode the condition of the Flip-Flops 51–54, providing that the Shift Latch is on and a signal present on line 21, to provide Reset Shift Counter signal on line 23, Load Shift Counter signal on line 25, Reset UP Counter signal on line 27, and Reset Shift and Data Latch signal on line 31.

Referring back to FIG. 1, with $\overline{PC}$ line on, Shift Latch 26 is held set. Thus, the first transition on line 13 after Ignore Latch 57 is set (see FIG. 2), is interpreted as a clock pulse, and control signals on lines 23–31 will be generated.

Referring to FIG. 3, the relationship between the amplified data at the transducer 15, the shaped data at line 13, the Any Pulser signal on line 33, the control signals on lines 23, 25, 27, and 31, the output of the Shift Latch on line 35, and the output of the Data Latch on line 43 are shown. The circuit of the invention provides signal 48 on line 35 which is equal in duration to the 75 percent of the time between clock pulses C1 and C2. When the signal on line 35 falls, the condition on line 43, representing the output of the data latch, is shifted into SERDES 34.

While the circuit has been described in connection with a hand driven magnetic encoded card, it will be apparent to those skilled in the art that double frequency data may be encoded in the card in other than magnetic form, such as alternating dark and light spaces. Also, the relative motion between the card and the transducer need not be obtained by driving one or the other by hand, but also mechanically, or by other means. Of course, the circuit of the invention is particularly useful where that relative motion is subject to wide velocity variations, such as in a low quality mechanical device.

In connection with FIG. 1, a shift counter 24 has been described. In this embodiment, the shift counter 24 was loaded with the complement of the contents of UP counter 20 and then incremented to an overflow condition. However, a down counter may be provided as shift counter 24, and the counter 24 loaded directly with the contents of the UP counter 20. An important aspect of the invention is that counter 24 need not be capable of both counting up and down.

According to one aspect of the invention, Pulser and Ignore circuit 40 has been described in connection with Counter 50. Other approaches for generating the control pulses on lines 23–31 in the sequence described in connection with FIG. 3 are apparent. One example would be the use of delay line circuits.

Provided the relative motion between the transducer and the card is constant, there is a direct relationship between distance and time, and between the time or distance between adjacent timing pulses on line 13 and the contents of counter 20, and 24. This is a practical assumption when considering the relationship between adjacent pairs of timing pulses on line 13, inasmuch as instantaneous changes in velocity of the card with respect to the transducer are, in practice, negligible. This, of course, need not be true throughout the pulse train.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for recovering data from a double frequency encoded signal train, comprising:
   first unidirectional counter means for generating a first count representing the time between adjacent timing signals in said signal train,
   second unidirectional counter means responsive to said count for generating an output signal upon counting said first count,
   means for incrementing said first counter at a first rate and said second counter at a second rate, with said second rate being faster than said first rate,
   transfer means responsive to the occurrence of said timing signals for transferring the contents of said first counter to said second counter,
   means responsive to said output signal for signalling the presence or absence of a data signal following the second of said timing signals.

2. The apparatus of claim 1, wherein said transfer means loads the complement of the contents of said first counter means into said second counter means, and said second counter means counts up to generate said output signal upon reaching an overflow condition.

3. The apparatus of claim 1, wherein said second counter counts down to generate said output signal upon counting to zero.

4. Apparatus for recovering double frequency encoded data from a record medium, comprising:
   transducer means responsive to relative motion of said medium for generating a pulse train of electrical signals including timing pulses and data pulses;
   oscillator means for generating clocking pulses, the frequency of said clocking pulses being greater than the frequency of said timing pulses;
   first counting means selectively driven by said pulse train of electrical signals and by said clocking pulses,
   means responsive to said first counting means deriving a first count representative of the number of initial pulses to be ignored for resetting said first counting means and transferring the control thereof to said clocking pulses;
   means responsive to said first counting means when under the control of said clocking pulses for generating a first signal representative of any pulse in said pulse train;
   means for decoding said first counter means when under the control of said clocking pulses for generating for each timing pulse in said signal train first, second, third, and fourth control signals in time sequential fashion;

second counting means for registering a second count representing the time between adjacent timing pulses in said signal train;

third counting means;

loading means responsive to said second control signal for conditioning said third counting means to count said second number;

means for causing said third counter to count said second number at a faster rate than said second counter;

said third counting means providing a fifth control signal upon counting said second number;

latch means for registering as a data pulse a pulse occurring in said signal train before provision of said fifth control signal, means responsive to said first control signal for resetting said third counter, means responsive to said third control signal for resetting said second counter, means responsive to said fourth control signal for conditioning said latch means to register a subsequent data pulse;

whereby data pulses in said pulse train are detected as those occurring after a timing pulse within a time that represents a fraction of the time between that timing pulse and the next preceding timing pulse where the time between timing pulses is subject to wide variations.

5. In a pulse train decoding system, apparatus for generating control signals comprising:

means for generating a signal train of electrical signals; oscillator means for generating electrical clocking signals, the frequency of said clocking signals being greater than the frequency of said signal train;

counting means selectively driven by said signal train and by said clocking signals;

means responsive to said counting means deriving a count representative of the number of initial signals in said signal train to be ignored for resetting said counting means and transferring control thereof to said clocking signals; and means for decoding said counting means when under control of said clocking signals for generating a plurality time sequential control signals.

6. Apparatus for decoding a signal train of double frequency encoded electrical signals, including timing and information signals, comprising:

means for generating high frequency electrical clocking signals, first dividing means responsive to said clocking signals for generating second clocking signals;

second dividing means responsive to said clocking signals for generating third clocking signals, said third clocking signals having a higher frequency than said second clocking signals;

first unidirectional counting means responsive to said second counting signals for generating a count representing the time between adjacent timing signals;

second unidirectional counting means responsive to said third counting signals for generating said count and, thereupon, providing a control signal, detecting means responsive to said control signal for detecting the next timing signal in said signal train and the presence or absence of an information signal.

* * * * *